(12) United States Patent  (10) Patent No.: US 8,480,029 B2
Young et al.  (45) Date of Patent: *Jul. 9, 2013

(54) OVERHEAD STOWAGE BIN LOAD TRANSFER AND BALANCE SYSTEM

(75) Inventors: David A. Young, Bellingham, WA (US); Steven L. Scown, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,489

(22) Filed: Sep. 5, 2012

(65) Prior Publication Data

US 2012/0325963 A1 Dec. 27, 2012

Related U.S. Application Data

(63) Continuation of application No. 12/638,878, filed on Dec. 15, 2009, now Pat. No. 8,262,022.

(51) Int. Cl.
*B64D 11/00* (2006.01)

(52) U.S. Cl.
USPC ............... 244/118.5; 244/118.6; 244/118.1

(58) Field of Classification Search
USPC ... 244/118.5, 118.6, 118.1; 165/100; 312/246
See application file for complete search history.

(56) References Cited

U.S. PATENT DOCUMENTS

| | | | | |
|---|---|---|---|---|
| 7,090,314 | B2 * | 8/2006 | Burrows et al. | 312/246 |
| 7,258,406 | B2 * | 8/2007 | Stephan et al. | 312/246 |
| 7,922,119 | B2 * | 4/2011 | Muin et al. | 244/118.5 |
| 7,937,169 | B2 * | 5/2011 | Kneller et al. | 700/83 |
| 8,262,022 | B2 * | 9/2012 | Young et al. | 244/118.5 |
| 2006/0214055 | A1 * | 9/2006 | Novak et al. | 244/118.5 |
| 2009/0283636 | A1 * | 11/2009 | Saint-Jalmes et al. | 244/118.5 |
| 2010/0288879 | A1 * | 11/2010 | Bock et al. | 244/118.5 |
| 2011/0139929 | A1 * | 6/2011 | Young et al. | 244/118.5 |
| 2011/0186681 | A1 * | 8/2011 | Vine et al. | 244/118.5 |

* cited by examiner

*Primary Examiner* — Christopher P Ellis
*Assistant Examiner* — Medhat Badawi
(74) *Attorney, Agent, or Firm* — Felix L. Fischer (57) ABSTRACT

An ergonomically improved stowage system includes a supporting structure, a bin having a volume with an opening to receive a load, the bin being movable with respect to the supporting structure from a closed to an open position, and an attaching mechanism for attaching the bin to the structure. The attaching mechanism includes a bin pivot axis that is located in substantial alignment with a center of gravity of the bin in the closed position.

9 Claims, 11 Drawing Sheets

OVERHEAD STOWAGE BIN LOAD TRANSFER AND BALANCE SYSTEM

REFERENCE TO RELATED APPLICATIONS

This application is a continuation of application Ser. No. 12/638,878 filed on Dec. 15, 2009 having the same title as the present application and a common assignee with the present application, the disclosure of which is incorporated herein by reference.

BACKGROUND

1. Field

This disclosure relates generally to the field of aircraft cabin stowage systems, and more particularly to an improved overhead stowage bin and supporting structure employing relative positioning of pivot points and moldline of the overhead stowage bin for counter balance to reduce the necessary closing force.

2. Related Art

Accommodation of luggage for passengers on airlines or on other public conveyances continues to require reconfiguration changes in the interior cabin arrangements. Due to constraints in passenger terminal time, new security requirements and airline policies regarding checking of luggage, more carry-on baggage is accompanying passengers onboard in the cabin. Carry on baggage has also increased in size and include more large rectangular rigid bags with the introduction of "roll aboard" carry-on baggage. Larger capacity stowage bins have been and continue to be employed by carriers to accommodate the increase in carry-on baggage. The capacity of overhead stowage bins has increased enough that the force required to lift and close pivot type bins can be up to 40-60 lbs. Flight attendants are often required to close multiple bins every flight Improper lifting of heavy bin loads could lead to costly work related injuries. Pivot or translating bin designs typically position the bin contents between the supporting pivot or mechanism and the bin user. The load of the bin contents and the bin weight itself is shared between mechanism and the bin user during translation of the bin between the open and closed position. To attempt to alleviate these issues, structural assist mechanisms have been added to help with the bin load. In current examples, the assist is accomplished using mechanical springs or gas springs.

Bins with assist mechanisms may not be intuitive for passengers to operate. For an empty bin, the assist springs may require force to pull down and open the bin and the mechanism requires a lock or detent position to keep the bin open while loading. Passengers are frequently unaware of the lock open position. If the passenger does not pull hard enough to engage the lock open mechanism, the bin closes while they lift their bag. Extra dampers may also be required to prevent the spring assist from slamming empty bins shut when luggage is removed from the bin. The extra springs and dampers add expense, weight and maintenance to the bin assemblies.

It is therefore desirable to provide a stowage bin that decreases the forces required for operation while remaining simple and intuitive to operate. Additionally, simplification of the bin to reduce cost, weight and maintenance requirements is desired.

SUMMARY

According to one exemplary embodiment, an ergonomically improved stowage system includes a supporting structure, a bin having a volume with an opening to receive a load, the bin being movable with respect to the supporting structure from a closed to an open position, and an attaching mechanism for attaching the bin to the structure, the attaching mechanism includes a bin pivot axis that is located in substantial alignment with a center of gravity of the bin in the closed position.

According to another exemplary embodiment, a support system for a stowage bin includes rotational bearings interconnecting first and second walls of a bin to first and second bulkheads of a support structure. The bearings being configured to rotate about a pivot axis located in substantial alignment with a center of gravity of the bin in a closed position. At least one-third of a load volume of the bin is disposed opposite the pivot axis in an open position.

According to yet another exemplary embodiment, a method for reducing stowage system forces in a stowage system includes providing a mounting structure, providing a bin with a load carrying volume, a depth of the bin being maximized by having an inboard corner of the bin with a minimized radius to allow an outboard portion of the bin contents to counter balance an inboard portion, and mounting the bin with pivot points forming a pivot axis substantially aligned with a center of gravity of the loaded bin in a closed position and with a counterbalancing portion of the volume outboard of the pivot point in an open position.

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein demonstrate a stowage bin which utilizes a pivot positioned near the center of gravity of a loaded bin. The bin shape and bin support geometry are also unique to enable the bin content center of gravity (CG) to settle and balance closer to the pivot point and accept a larger bag. The lower corner of the bin is a smaller radius and the passenger stowage unit (PSU) angle is more horizontal. The mass of the bin contents is therefore positioned on both sides of the pivot. The bin contents act as a counter balance to reduce the mass the user must lift to close the overhead bin thereby providing significantly improved ergonomics for the bin. The bin is geometry is strategically arranged so the CG of the bin is above the bin pivot when the bin is closed and on the user side slightly offset from the bin pivot when the bin is open. This geometry results in a bin that will open on its own when unlatched and stay open for loading, while transferring most or all of the bin and content mass to the bin support structure as it is closed.

Figure 1:
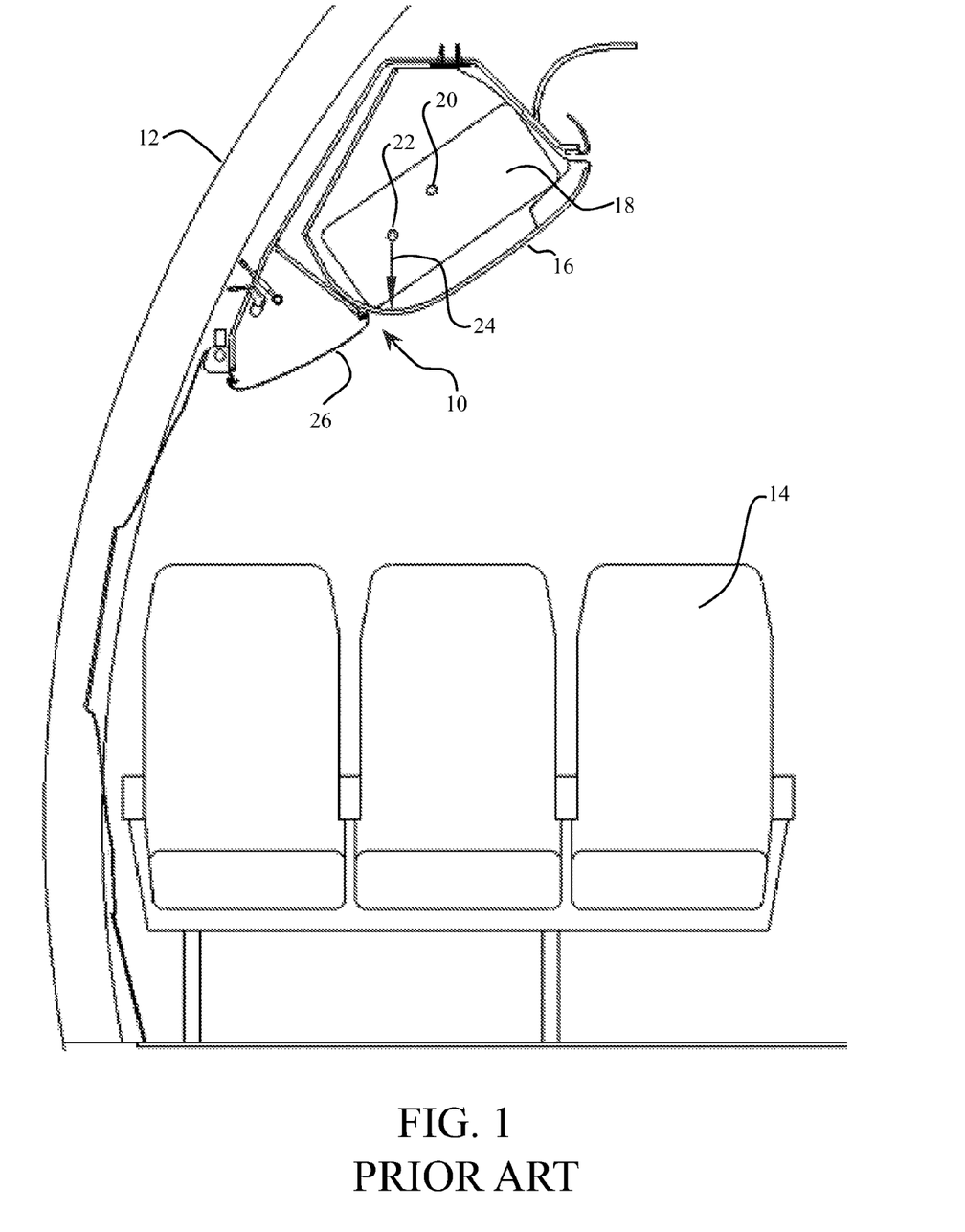
FIG. 1 is a sectional view of a prior art stowage bin configuration in the closed position in a passenger stowage unit of an aircraft fuselage.
Figure 2:
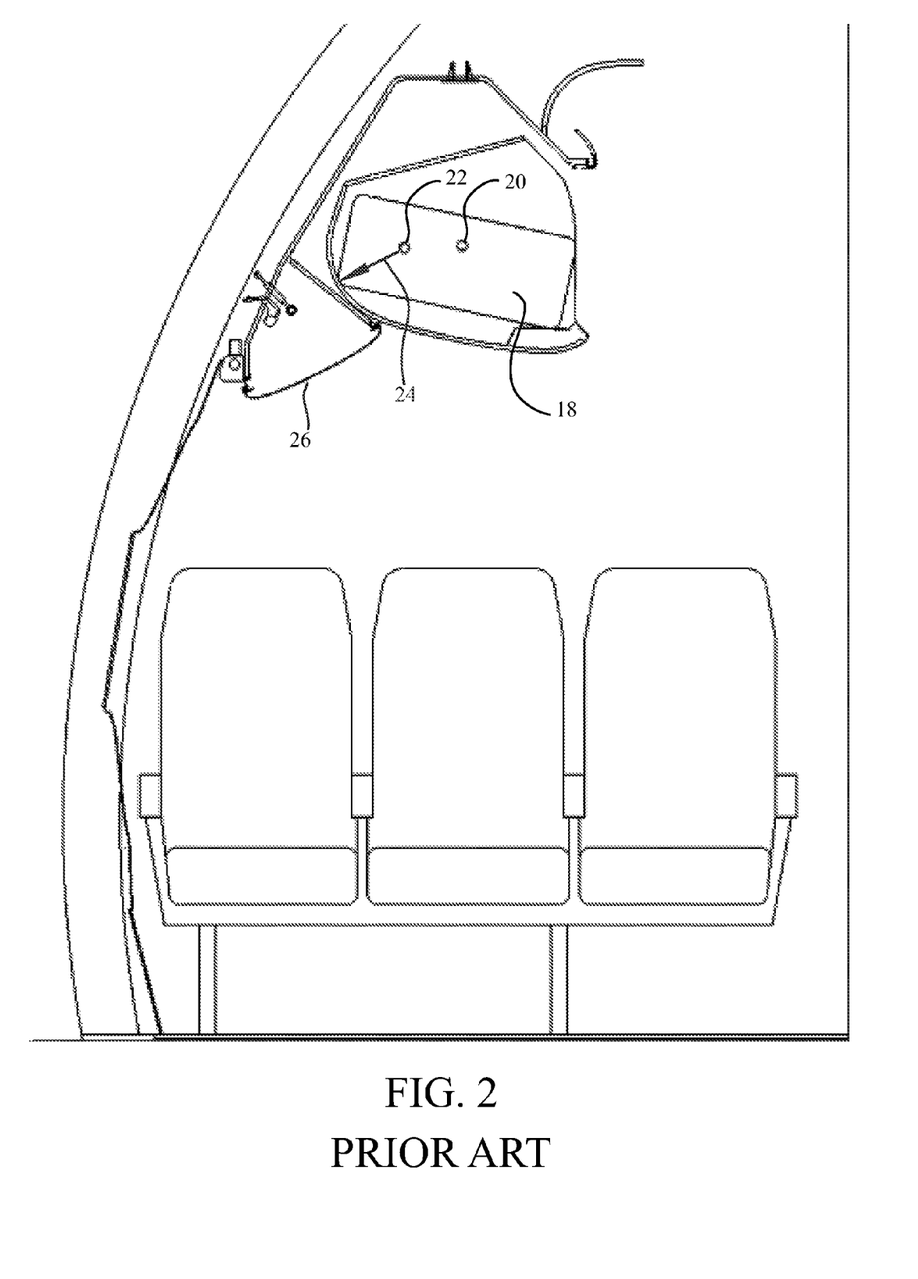
FIG. 2 is a sectional view of the prior art stowage bin configuration in the open closed position in the aircraft fuselage.
Figure 3:
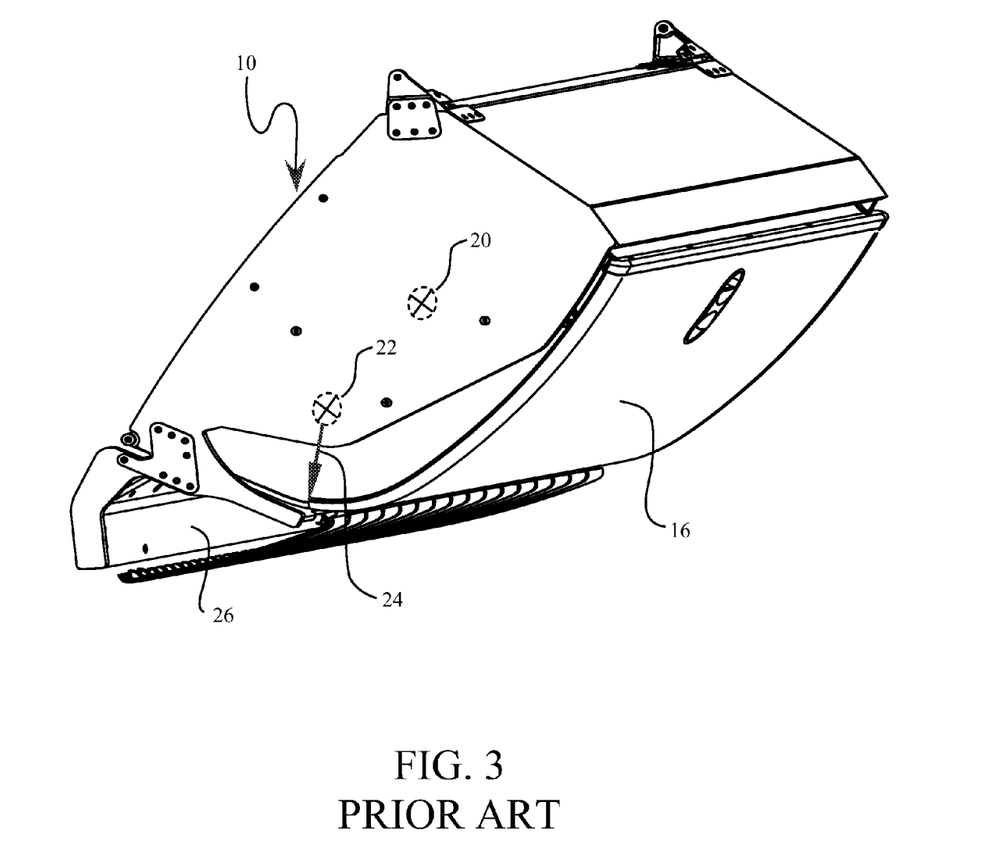
FIG. 3 is a detailed view of the prior art stowage bin in the closed position.
Figure 4:
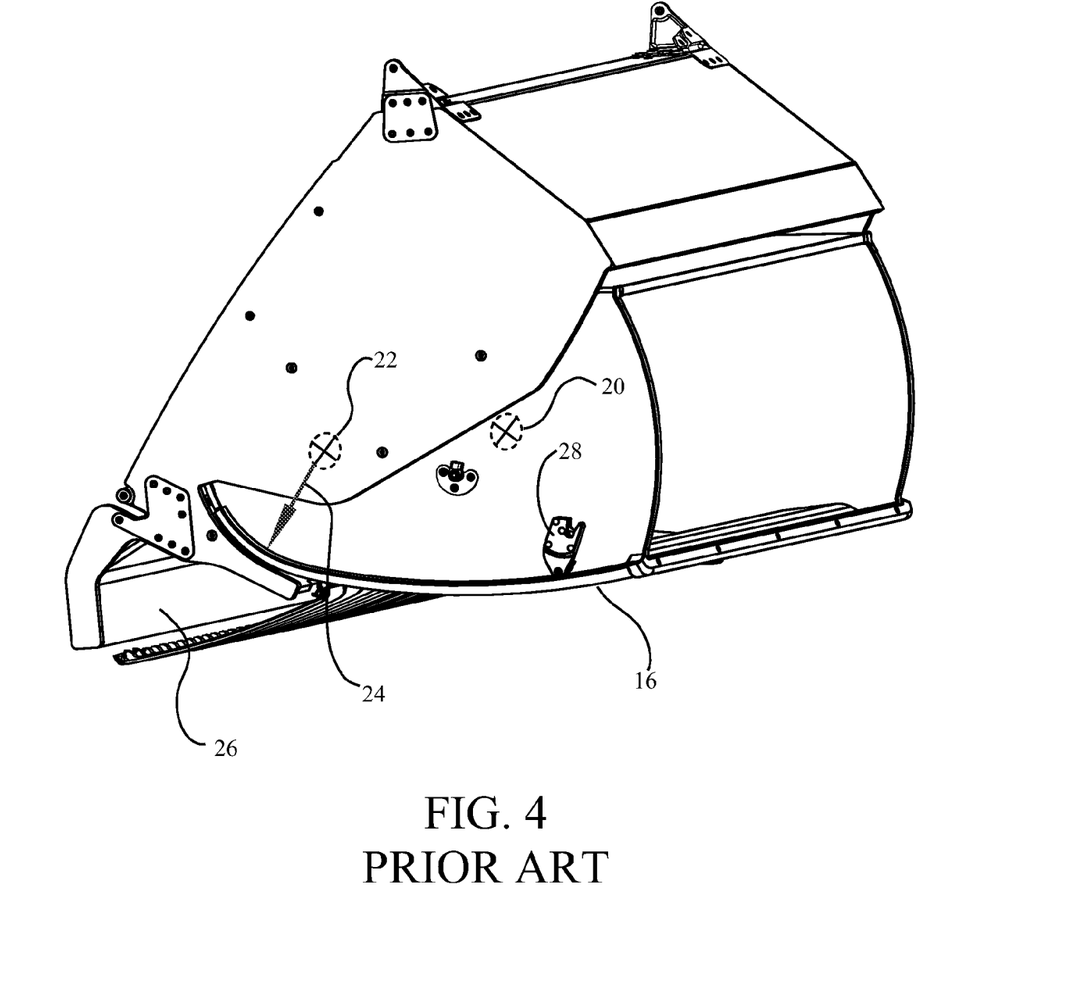
FIG. 4 is a detailed view of the prior art stowage bin in the open position.

Prior art stowage bin systems as shown in FIGS. 1-4 employ a geometry which creates significant moment about the pivot point in the loaded bin resulting in high closure forces. As shown in FIG. 1 for an exemplary prior art configuration in a passenger cabin in an aircraft fuselage, the passenger stowage unit (PSU) 10 is mounted from or adjacent to the fuselage wall 12, typically over seat rows 14. The closed bin 16, as shown in FIG. 1 and in detail in FIG. 3, with a typical piece of luggage 18 loaded within the bin results in a center of gravity 20. The pivot point 22 for the bin is arranged to provide a constant radius 24 in the bin shell for clearance from the stowage bin support structure 26 during rotation to the open position as shown in FIG. 2 and in detail in FIG. 4. Approximately three-quarters of the mass of the loaded bin is inboard of the pivot point as shown by the center of gravity location 20 relative to the pivot point 22.

As will be discussed in greater detail subsequently with respect to FIGS. 10 and 11, the arrangement of the prior art bin, as demonstrated in the drawings, results in very high loads required to close the bin and/or to prevent it from swinging open when unlatched. Further, the latch mechanisms required to maintain the bin in the closed position must be very structurally robust which adds weight and complexity to the bin and PSU structure. As a minimum, latches typically require catch pawls 28 (shown in FIG. 4) at both sides of the bin to restrain it in the closed position and avoid longitudinal torquing of the bin.

Figure 5:
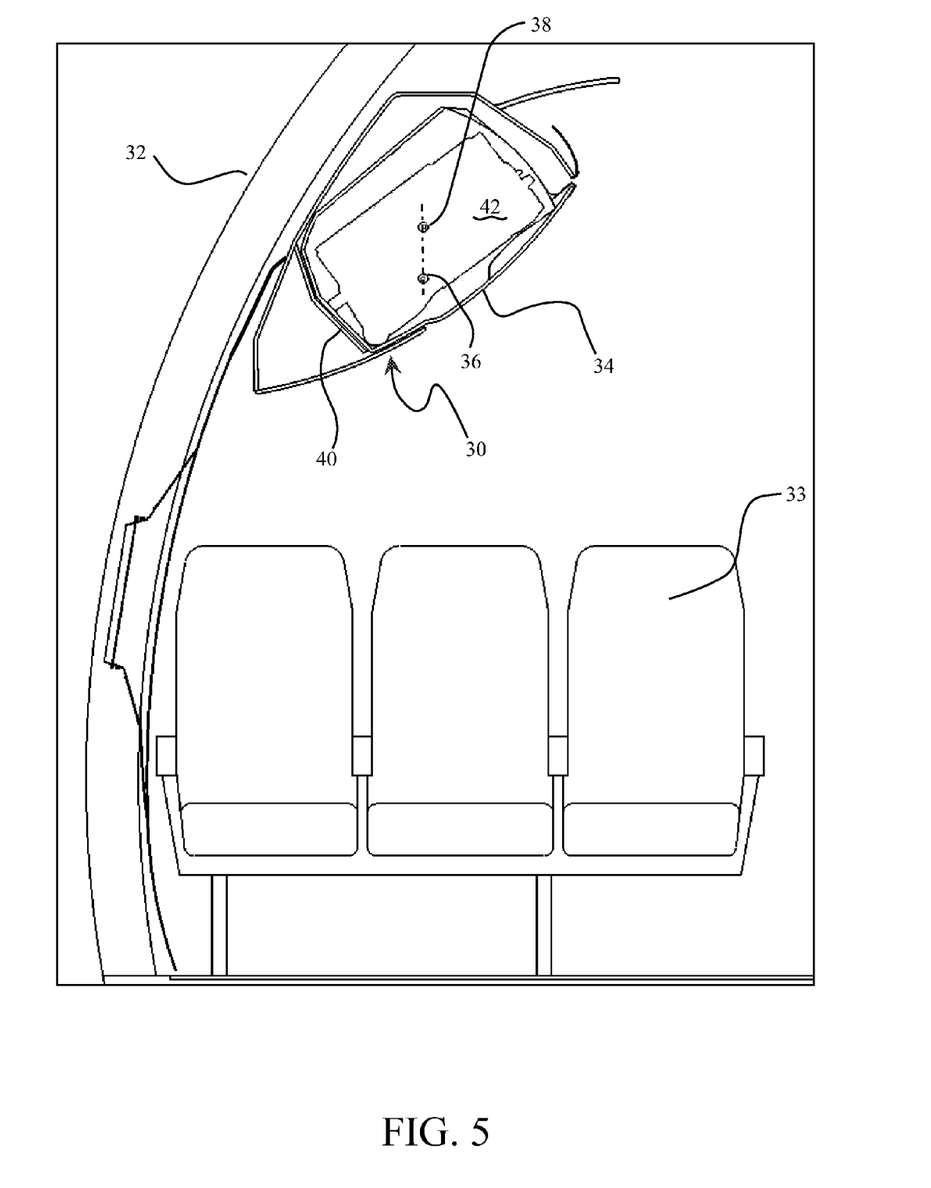
FIG. 5 is a sectional view of an exemplary stowage bin embodiment in the closed position in a passenger stowage unit of an aircraft fuselage.
Figure 6:
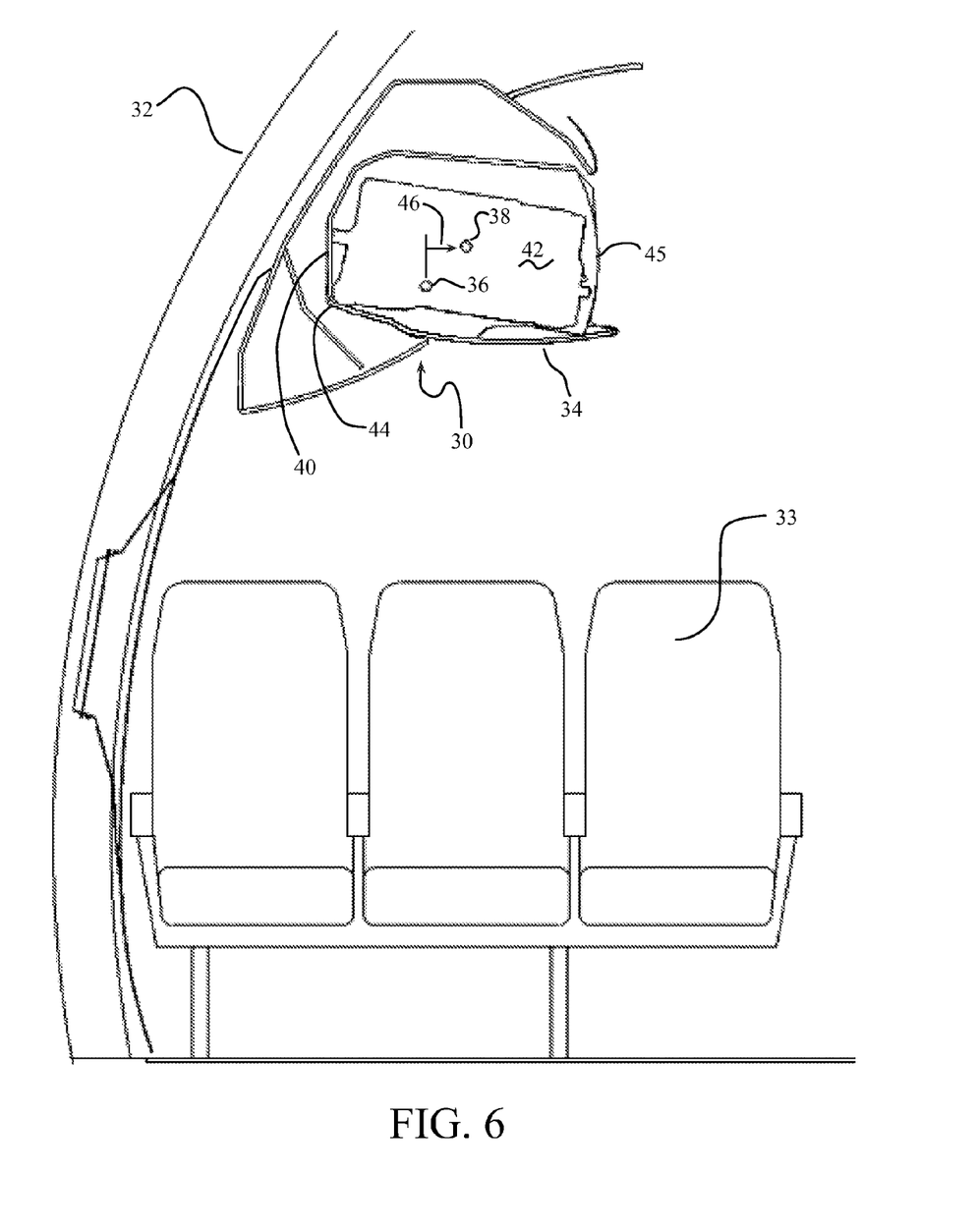
FIG. 6 is a sectional view of the exemplary stowage bin embodiment in the open position in the aircraft fuselage.

An exemplary embodiment is shown in FIGS. 5-8 which substantially reduces forces associated with the opening and closing of a stowage bin. As shown in FIGS. 5 and 6 for an exemplary installation in a PSU 30 incorporated in the interior of an aircraft fuselage 32 over seating rows 33, ergonomically improved bin 34 is mounted with mounting mechanism having a pivot point 36 on each side of the bin to create a pivot axis 37 (shown for reference in FIG. 8) with the pivot points and pivot axis substantially in vertical alignment with the loaded center of gravity 38 (as best seen in FIG. 5). The mounting mechanism position also allows the moldline or profile of a lower portion 40 of the bin to be broadened to a trapezoidal or rectangular cross sectional shape to accept a larger piece of luggage 42 while allowing the bin content center of gravity (CG) to settle and balance more closely in alignment with the pivot points and pivot axis. An outboard portion of the bin contents such as the lower half of luggage 42 counter balances the weight of the inboard portion of the bin contents such as the upper half of luggage 42. A lower corner 44 of the bin employs a small radius which may approach linear perpendicularity of the bin front wall and bottom for the broadened profile of lower portion 40 and the angle of the open bin in the PSU is substantially horizontal as shown in FIG. 6. Employing a lower bin corner that is not concentric to the pivot point (traditional design) and more square enables larger rectangular roll aboard bags and other carry-on bags to stow further in the bin support with the bin CG closer to the bin pivot. The mass of the bin and contents is therefore positioned on both sides of the pivots 36. For the exemplary embodiment at least one-third (⅓) of the volume of the bin and therefore the carried load is maintained on an opposite side of the pivot axis from the bin opening 45 in the open position. The bin contents act as a counter balance to reduce the force the user must apply to lift and close the overhead bin. Therefore, as shown in FIG. 6, the moment arm 46 of the center of gravity 38 is significantly reduced while as shown in FIG. 5, the center of gravity is in alignment with the pivot points and pivot axis resulting in an evenly balanced bin in the closed position.

Figure 7:
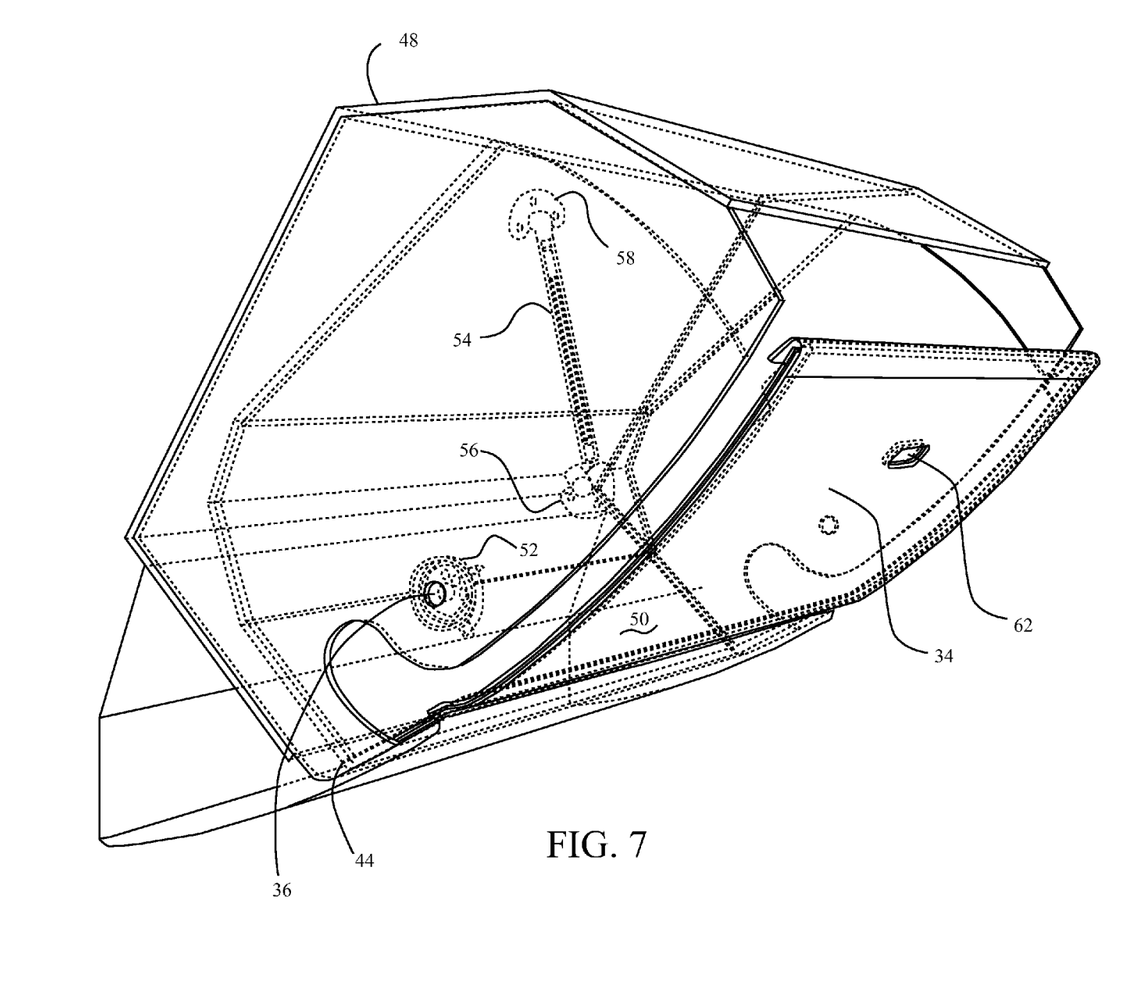
FIG. 7 is a detailed view of the exemplary embodiment of the stowage bin in the closed position in the structure of the passenger stowage unit.
Figure 8:
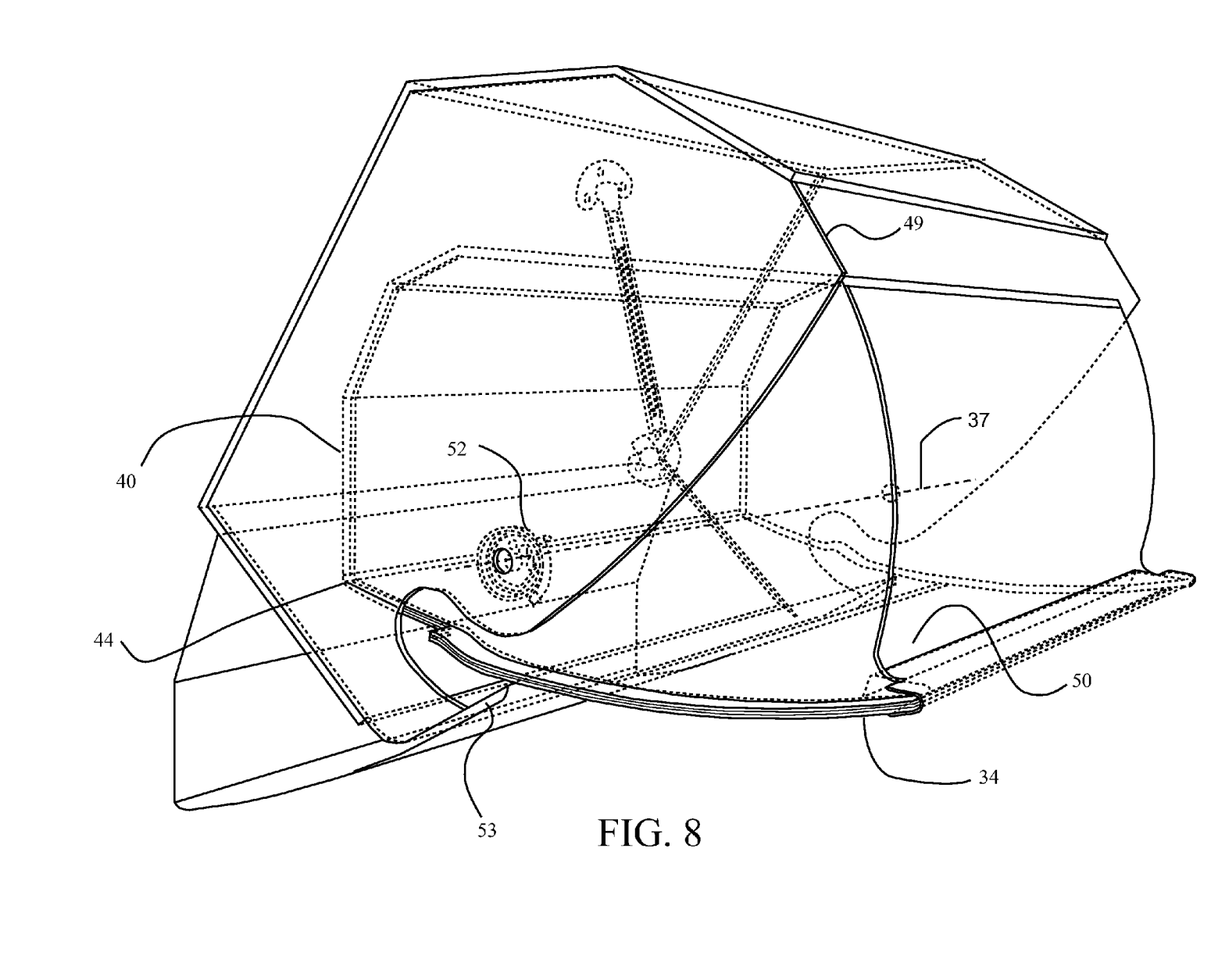
FIG. 8 is a detailed view of the exemplary embodiment of the stowage bin in the open position.

As shown in detail in FIGS. 7 and 8, bin 34 is supported by a structural shell 48 having first or fore and second or aft bulkheads 49. The small radius of the lower corner 44 allows a substantially flat profile for a front wall 50 of the bin with only a slight curvature for aesthetic appearance in the embodiment shown. Positioning of a rotating bearing mechanism 52 for attachment of bin first or fore and second or aft walls 51 at pivot point 36 accommodates a lip 53 in the stowage support structure allowing a constant clearance gap for the bin front wall 50 in both the open and closed position of the bin without requiring a large radius in the bin profile for rotating clearance between the open and closed position as in the prior art. The bin is geometry is strategically arranged so the CG of the bin is above and substantially vertically aligned with the bin pivot when the bin is closed with approximately fifty percent (50%) of the bin and contents on either side of the bin pivot. When the bin is open the bin CG is slightly offset and on the user side of the pivot axis such that approximately thirty-three percent (33%) of the mass is on the far side and sixty-six percent (66%) on the near side of the rotation point. This geometry results in a bin that will open on its own when unlatched and stay open for loading, while transferring most or all of the bin and content mass to the bin support structure as it is closed. The embodiment shown allows a simple pneumatic strut 54 or other mechanical damper to be connected between a boss 56 on the bin and a boss 58 on in the structural shell 48 of the PSU to provide rate control as the bin rotates to the open position.

Figure 9:
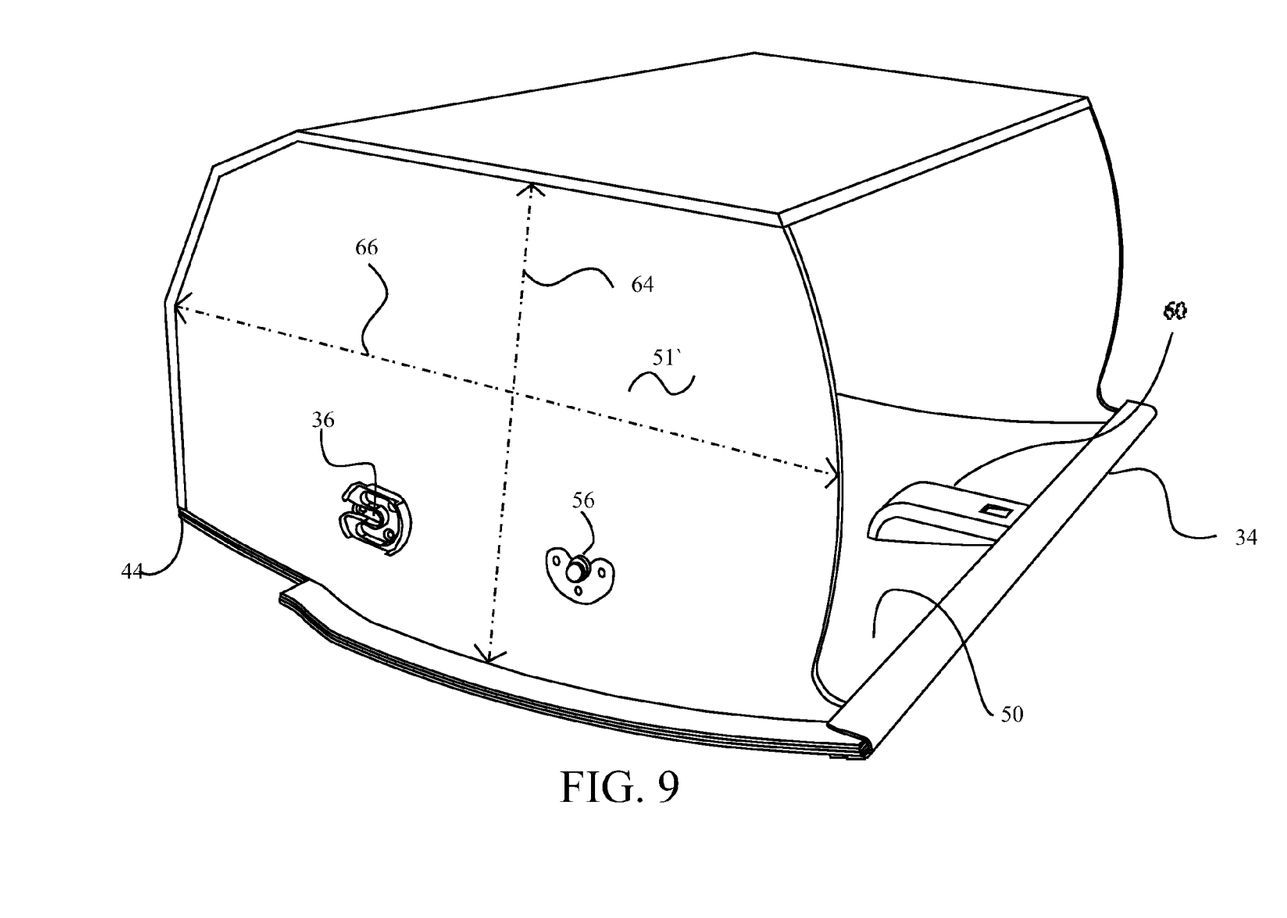
FIG. 9 is a detailed view of the stowage bin without the passenger stowage unit structure and showing an exemplary central latch configuration.

As shown in detail in FIG. 9 for the exemplary embodiment, the bin 34 may have a substantially trapezoidal shaped cross section faired by the curvature of the lower inboard corner 44. Filleting or chamfering of the corners or bowing of the bottom surface as shown in the drawings may be accomplished to encourage load centering or provide corner clearance during rotation of the bin while allowing maximum internal volume approaching a rectangular cross section. The significantly reduced forces in the closed position of the bin, even at maximum loading, allows a simple single latch mechanism 60 located substantially centered longitudinally on the bin to be affixed to the interior of the front wall 50 with activation through a finger pull 62 (best seen in FIG. 7) or comparable push button arrangement. For exemplary configurations for use in aircraft, positioning of the rotating bearing mechanism and thus the pivot axis between approximately twenty and twenty-five percent (20% and 25%) of the width 64 of the bin and between approximately thirty and thirty-five percent (30 and 35%) of the height 66 of the bin substantially achieves the desired weight distribution in the bin for the relative CG and pivot point locations providing substantial vertical alignment in the closed position within a nominal ±5°. These ranges achieve desired moment arms and rotation angles consistent with passenger stowage unit configurations in both narrow and wide body aircraft to minimize load at the closure point. Within the constraints of aircraft interior configuration, a pivot axis location which achieves a zero load condition at the closure point is desired.

Figure 10:
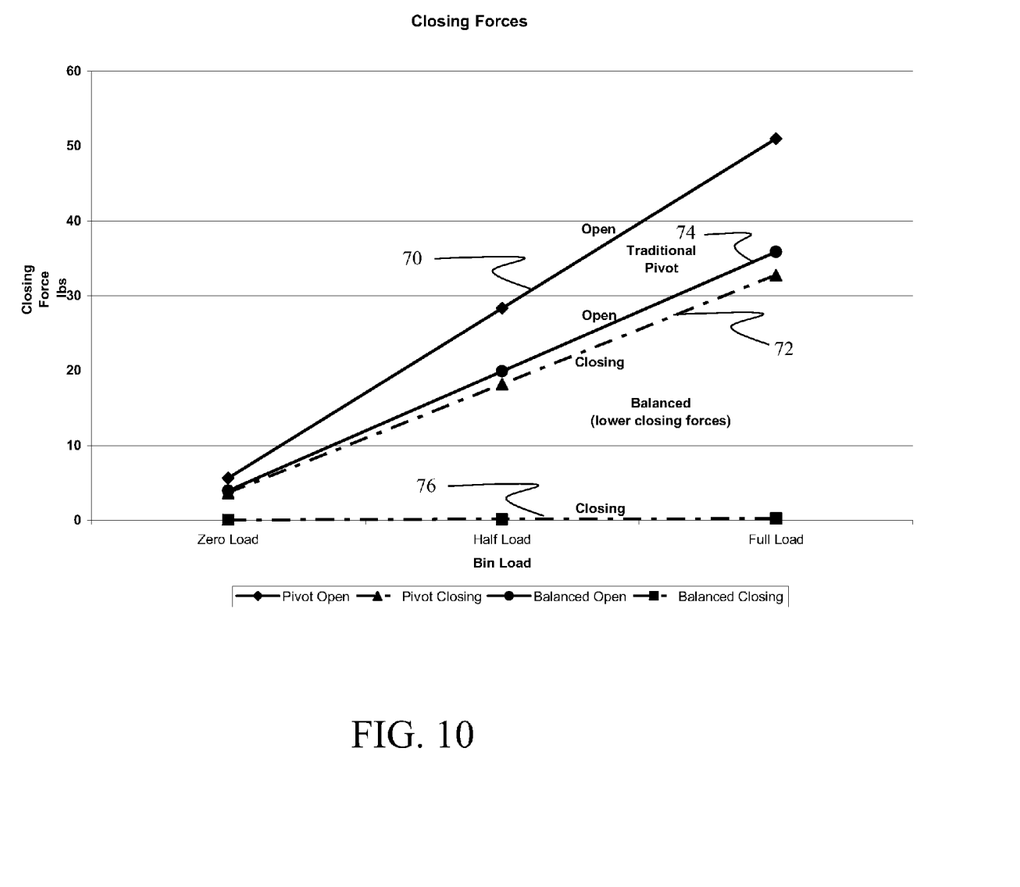
FIG. 10 is a graph showing opening and closing forces associated with the prior art stowage bin and the exemplary embodiment for various loads and positions; and, FIG. 11 is a graph showing opening and closing forces associated with the prior art stowage bin and the exemplary embodiment for specific loads in the open and closed positions.
Figure 11:
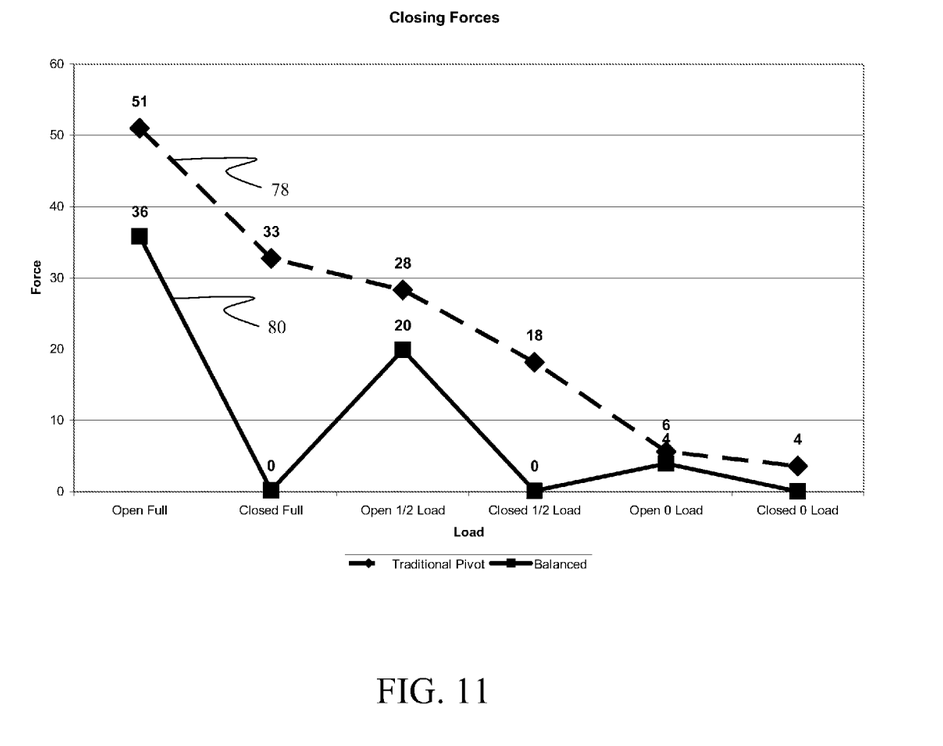

The reduced forces for operating the stowage bin as described in the exemplary embodiments are demonstrated empirically in FIGS. 10 and 11. FIG. 10 shows a graph of force required to rotate the bin at the fully open position as a function of bin load and force required to rotate the bin at substantially the closed position immediately prior to latching or after unlatching (closing position). For a prior art storage bin, traces 70 and 72 demonstrate the force required to rotate the bin at the open position and closing position respectively. Exemplary data for the values charted include 14 lbs of empty bin weight with a maximum load of 113 lbs (127 lbs total weight). For an empty bin (zero load) the bin weight itself requires approximately 6 lbs of force at the open position and 4 lbs force at the closing position. With the bin at half load, 28 lbs of force is required at the open position and 18 lbs is required at the closing position. At full load, 51 lbs is required at the open position and 33 lbs is required at the closing position. The comparable loadings for the exemplary embodiments employing the balanced pivot placement are shown in traces 74 and 76. With the bin empty, the force required for rotation at the open position is 4 lbs while at the closed position load is evenly balanced and force required is zero. Under half load conditions, the force required in the open position increases to 20 lbs while the force at the closing position remains at zero. Finally at the full load, the force required at the open position is 36 lbs (reduced from 51 lbs in the prior art) and still remains at zero for the closing position (reduced from 33 lbs in the prior art).

FIG. 11 presents the same data arranged with open position and closing position adjacent to one another for the various load conditions to demonstrate the actual force scenario that would be encountered by a user for various loading of the bin. Trace 78 demonstrates the prior art force requirements while trace 80 presents the force requirements for the exemplary embodiments. While the exemplary embodiments have been described herein with respect to implementation in an aircraft, the embodiments are equally applicable to usage in trains, busses, ferries or other forms of public or private conveyance.

The design of the exemplary embodiments provides a stowage system with reduction in force requirements by mounting the bin within the stowage support structure placing the pivot point slightly offset and substantially in vertical alignment with the fully loaded center of gravity for the bin in the closed position and maximizing the depth of the bin relative to the center of gravity by minimizing the radius of the inboard bottom corner of the bin thereby allowing the outboard portion of the bin contents to counter balance the inboard portion of the bin contents with respect to the pivot axis in the open position thereby reducing the moment arm of the center of gravity and associated forces for closing the bin.

Having now described various embodiments of the invention in detail, those skilled in the art will recognize modifications and substitutions to the specific embodiments disclosed herein. Such modifications are within the scope and intent of the present invention as defined in the following claims.

What is claimed is:

1. A support system comprising:
rotational bearings interconnecting first and second walls of a bin to first and second bulkheads of a support structure, the bearings being configured to rotate about a pivot axis located in substantial alignment with and below a center of gravity of the bin in a closed position, the center of gravity between the bin opening and the pivot axis in an open position and with at least one-third of a load volume of the bin being disposed opposite the pivot axis in an open position.

2. The support system as defined in claim 1 wherein the bin has one of a substantially rectangular cross section and a trapezoidal cross section.

3. The support system as defined in claim 1 further comprising a single latching mechanism located substantially centered longitudinally on a front wall of the bin.

4. The support system of claim 1 wherein the rotational bearings are located at between twenty and twenty-five percent of the width of the bin.

5. The support system of claim 1 wherein the rotational bearings are located at between twenty-five and thirty-five percent of the height of the bin.

6. The support system of claim 1 wherein the rotational bearings are located at between thirty and thirty-five percent of the height of the bin.

7. The support system of claim 1 wherein the bulkheads are incorporated in an aircraft cabin.

8. The support system of claim 7 wherein the support structure is employed in a passenger stowage unit.

9. The support system of claim 8 wherein the bin is a stowage bin.

* * * * *